United States Patent [19]
Wei et al.

[11] Patent Number: 5,925,479
[45] Date of Patent: *Jul. 20, 1999

[54] MOISTURE BARRIER COMPOSITE FILM OF SILICON NITRIDE AND FLUOROCARBON POLYMER AND ITS USE WITH AN ON-CELL TESTER FOR AN ELECTROCHEMICAL CELL

[75] Inventors: Guang Wei, Somerville; Jack Treger, Quincy; Bryan Christopher Lagos, Needham, all of Mass.

[73] Assignee: Duracell, Inc., Bethel, Conn.

[ * ] Notice: This patent is subject to a terminal disclaimer.

[21] Appl. No.: 08/695,277

[22] Filed: Aug. 5, 1996

Related U.S. Application Data

[62] Division of application No. 08/376,700, Jan. 23, 1995, Pat. No. 5,593,794.

[51] Int. Cl.⁶ .......................... G01R 19/165; H01M 6/50; H01M 10/48
[52] U.S. Cl. .......................... 429/91; 324/76.11; 324/426; 324/433; 324/435; 428/421; 428/422; 428/446; 428/451; 429/90; 429/92; 429/93
[58] Field of Search .................................. 428/421, 422, 428/446, 451; 156/275.5, 307.1; 427/527, 569, 579, 582, 583, 585, 588, 255.6, 372.2; 324/426, 433, 435, 76.11; 429/91, 90, 92, 93

[56] References Cited

U.S. PATENT DOCUMENTS

| | | | |
|---|---|---|---|
| 3,940,506 | 2/1976 | Heinecke | 427/38 |
| 4,457,972 | 7/1984 | Griffith et al. | 428/334 |
| 4,543,275 | 9/1985 | Akashi et al. | 427/250 |
| 4,723,656 | 2/1988 | Kiernan et al. | 206/333 |
| 5,032,461 | 7/1991 | Shaw et al. | 428/461 |
| 5,137,780 | 8/1992 | Nichols et al. | 428/336 |
| 5,188,231 | 2/1993 | Knell et al. | 206/333 |
| 5,250,905 | 10/1993 | Kuo et al. | 324/435 |
| 5,339,024 | 8/1994 | Kuo et al. | 324/435 |
| 5,355,089 | 10/1994 | Treger | 324/435 |
| 5,396,177 | 3/1995 | Kuo et al. | 324/435 |
| 5,409,777 | 4/1995 | Kennedy et al. | 428/411.1 |
| 5,424,131 | 6/1995 | Wertheimer et al. | 428/413 |
| 5,527,596 | 6/1996 | Kimock et al. | 428/216 |
| 5,549,935 | 8/1996 | Nguyen et al. | 427/490 |
| 5,593,794 | 1/1997 | Wei et al. | 429/91 |
| 5,594,231 | 1/1997 | Pellicori et al. | 235/462 |
| 5,607,789 | 3/1997 | Treger et al. | 429/90 |
| 5,681,666 | 10/1997 | Treger et al. | 429/90 |

FOREIGN PATENT DOCUMENTS 0523901  1/1993  European Pat. Off. .

Primary Examiner—Rabon Sergent
Attorney, Agent, or Firm—Barry D. Josephs; Paul I. Douglas

[57] ABSTRACT

A light transparent moisture barrier useful for preventing moisture from destroying the effectiveness of a moisture sensitive cell condition tester on an electrochemical cell, comprises a plurality of very thin layers of amorphous silicon nitride and a hydrophobic fluorocarbon polymer on a flexible, polymeric substrate. The layers are formed on the substrate by a deposition process such as sputtering. The thickness of any individual layer is less than one micron.

10 Claims, 1 Drawing Sheet

MOISTURE BARRIER COMPOSITE FILM OF SILICON NITRIDE AND FLUOROCARBON POLYMER AND ITS USE WITH AN ON-CELL TESTER FOR AN ELECTROCHEMICAL CELL

This application is a division of application Ser. No. 08/376,700 filed Jan. 23, 1995 now U.S. Pat. No. 5,593,794.

BACKGROUND OF THE INVENTION

1. Field of the Invention

This invention relates to a light transparent, moisture barrier film composite. More particularly, this invention relates to a light transparent, thin film composite comprising layers of silicon nitride and fluorocarbon polymer which is useful as a moisture barrier for a moisture sensitive on-cell tester, a process for making said barrier and to an electrochemical cell having a moisture sensitive on-cell tester and said barrier.

2. Background of the Disclosure

The use of cell condition testers, such as thermochromic voltage testers, to visually indicate the condition of an electrochemical cell, commonly referred to as a battery, has become very popular and provides a value added advantage to the battery manufacturer and to the consumer. These testers are used with primary electrochemical cells, although they can also be used by consumers to test the condition of a secondary or rechargeable electrochemical cell if desired. The most popular tester presently in use is a thermochromic material in contact with an electrical resistance element which forms an integral part of a battery package in which the batteries are alkaline primary cells. The user places the terminals of the cell between the contacts of the tester and squeezes the contact ends of the tester to make electrical contact with the cell terminals which are the ends of the cell. The resistance element of the tester is heated in proportion to the cell voltage and the thermochromic material provides a qualitative indication of the condition of the cell over a range indicating "good" or "replace". This kind of tester is disclosed, for example, in U.S. Pat. No. 4,723,656. An integral, thermochromic package tester which can also be removed from the package is disclosed in U.S. Pat. No. 5,188,231. More recently, on-cell testers have been developed in which the cell condition indicator is an integral part of the cell label. These on-cell testers include both the thermochromic type and a new, electrochemical type of tester. An example of a thermochromic type of on-cell tester is disclosed in European Patent Publication No. 0 523 901 A1, the disclosure of which is incorporated herein by reference. Unlike the thermochromic type which employs a resistance element to produce heat and which can therefore not be permanently attached to the terminals of the cell without continuously discharging it, the new electrochemical type does not draw current from the cell and can therefore be permanently attached to the terminals of the cell without discharging the cell. This new type of tester is disclosed in U.S. Pat. Nos. 5,250,905 and 5,339,024 the disclosures of which are incorporated herein by reference. As is disclosed in U.S. Pat. No. 5,355,089 some electrochemical types of on-cell condition testers employ hygroscopic or otherwise moisture sensitive electrolyte compositions and means are necessary to prevent moisture from reaching the electrolyte which will impair the effectiveness of the tester. This patent discloses a number of solutions to this problem, the best of which is mica. However, although relatively inexpensive, mica is not available in long ribbons or other forms which permit it to be rolled into a roll of mica which is needed for economically viable commercial production methods.

SUMMARY OF THE INVENTION

The invention relates to a light transparent composite useful as a moisture barrier, which comprises at least one layer of silicon nitride and at least one layer of fluorocarbon polymer, preferably at least two layers of silicon nitride and at least two layers of fluorocarbon polymer and which is formed by depositing or forming said silicon nitride and said fluorocarbon polymer layers onto a substrate. In one embodiment, the composite of the invention comprises at least four layers, with at least one layer of silicon nitride and at least one layer of fluorocarbon polymer on one side of the substrate and at least one layer of silicon nitride and at least one layer of fluorocarbon polymer on the opposite side of the substrate. In another embodiment, more than one layer of the silicon nitride and more than one layer of the fluorocarbon polymer are on one side or surface, only, of the substrate. In this embodiment, and in the embodiment in which there is more than one layer of each of the silicon nitride and the fluorocarbon polymer on each of opposite sides (e.g., top and bottom) of the substrate, the composite comprises alternating layers of silicon nitride and fluorocarbon polymer. The invention includes multilayer composites in which there is more than two layers of each of the silicon nitride and fluorocarbon polymer, with the actual number of layers depending on the desired properties of the composite and being limited only by the ability of the practitioner to deposit a large number of layers. In one embodiment in which the composite of the invention is used as a moisture barrier for an on-cell tester for an electrochemical cell, the substrate is a flexible polymer and the composite is a flexible, light transparent, thin film composite in which the thickness of each of the silicon nitride and fluorocarbon polymer layers is less than one micron. In a further embodiment, the composite of the invention is used as a transparent packaging material for moisture sensitive materials and articles. When used as a moisture barrier for an on-cell tester, the light transparency of the composite enables a user to see the condition of the cell as exhibited by color, indicia or other visual means used by the tester to indicate the cell condition. By on-cell tester is meant a tester which visually indicates the cell condition and is permanently attached to the cell either by means of the cell label or by other means, although the invention is not limited to this embodiment. One type of a moisture sensitive, on-cell tester for which the moisture barrier composite of the invention is useful, is a tester which includes at least one hygroscopic material which, if it absorbs water vapor, impairs or destroys the effectiveness of the tester. Another type is a tester which includes at least one component requiring the presence of a predetermined amount of water to function and which therefore needs a moisture barrier to maintain that level of water in the tester.

Both the silicon nitride and the fluorocarbon polymer are water insoluble, with the fluorocarbon polymer selected to have as low a water vapor permeation rate as possible for moisture barrier applications. For moisture barrier applications it is preferred that the fluorocarbon polymer is hydrophobic. The process for making the multilayer composite comprises depositing a layer of silicon nitride onto a substrate, followed by depositing a layer of fluorocarbon polymer over the silicon nitride layer. If more than one layer of the silicon nitride and fluorocarbon polymer are required, the alternating layer deposition process is continued until the desired number of layers have been applied. Thus, the composite of the invention is distinguished from laminates in which various pre-existing layers are adhesively or otherwise bound to each other, in that the alternating layers of the composite of the invention are formed in-situ on the substrate and on other layers of the composite, by deposition or coating processes which include sputtering, physical vapor deposition, including plasma-enhanced physical vapor deposition, chemical vapor deposition and the like.

DETAILED DESCRIPTION

Figure 1:
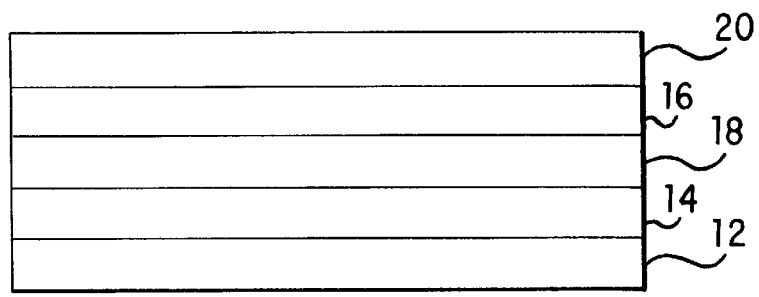
FIG. 1 schematically illustrates a four layer moisture barrier on a polymeric substrate according to the invention.

FIG. 1 schematically illustrates a thin film moisture barrier 10 of the invention as comprising a flexible plastic substrate 12, with a layer of silicon nitride, layers 14 and 16, deposited on both sides of the substrate. A layer of a hydrophobic, fluorocarbon polymer, layers 18 and 20, is shown as deposited over each of the silicon nitride layers. Thus, the multilayer moisture barrier illustrated in this Figure is a four layer composite (exclusive of the substrate). If desired, the four layer composite is deposited on only one side of the substrate. Additional layers of the silicon. nitride and the fluorocarbon polymer are alternately deposited over each other on either one side of the substrate or on both sides of the substrate to form a six, eight, ten, twelve or even a one hundred layer composite, if desired. Thus, a first layer of silicon nitride is deposited on one or both sides of the substrate and then a first layer of fluorocarbon polymer is deposited over the silicon nitride layer or layers. A second layer of silicon nitride is then deposited over the first layer or layers of fluorocarbon polymer and a second layer of fluorocarbon polymer is then deposited over the second layer or layers of silicon nitride. This alternating layer deposition process is repeated until a thin film, multilayer composite having the desired number of layers is formed. The thickness of each of the silicon nitride layers is within the range of from about 200 angstroms to about 5,000 angstroms, preferably from about 250 angstroms to 2500 angstroms, and still more preferably from 500 to 1,000 angstroms. The thicknesss of each of the fluorocarbon polymer layers is within the range of from about 250 angstroms to one micron and preferably from 300 to 5,000 angstroms. Increasing the thickness of the silicone nitride will increase its tendency to crack and increasing the thickness of the fluorocarbon polymer layer increases stress in each deposited layer, which increases the tendency of the polymer layers to peel away from the silicon nitride. On the other hand, decreasing the layer thickness increases the possibility of void formation and incomplete coverage. Either of these situations reduces the effectiveness of the composite as a moisture barrier. The number of layers and layer thickness will, of course, depend on the intended use of the multilayer composite and on the particular fluorocarbon polymer. Further, the silicon nitride is relatively brittle and is prone to crack when flexed or bent. Depositing a layer or coating of polymer over the silicon nitride layer greatly reduces its tendency to crack and also protects it from damage when handled. In the embodiment illustrated in FIG. 1, both sides or surfaces of the silicon nitride layers are protected by an adjacent polymer layer, one of which is the fluorocarbon polymer and the other is the substrate. It is a preferred embodiment in the practice of the invention that the surface of the silicon nitride is protected and that the outer layer or layers of the composite are polymeric. If desired however, the outer layer or layers of the composite may be silicon nitride.

The invention includes embodiments in which (a) not all of the silicon nitride layers of the composite are of the same thickness, (b) not all of the fluorocarbon polymer layers are of the same thickness and (c) combinations thereof in which not all of the silicon nitride layers are of the same thickness and not all of the fluorocarbon layers are of the same thickness. Other embodiments include a composite in which not all of the fluorocarbon polymer layers are of the same composition and also in which some of the polymer layers are not fluorocarbon polymers. In yet another embodiment, substrate 12 is a web having a releasable surface on which the first layer is deposited, so that the multilayer composite is removed and used without the substrate on which it was formed. In still another embodiment, a composite of the invention is formed on a first substrate which is a web having a releasable surface and then transferred to a second substrate to which it is attached by any suitable means. For most applications a substrate is needed for strength to enable the multilayer composite to be handled and used in manufacturing processes without breaking. As set forth above, the transparent composite of the invention is useful as a thin film moisture barrier for electrochemical testers and as packaging material for moisture sensitive foods, chemicals, biological materials and pharmaceuticals, electronics and articles. In addition to its moisture barrier properties and transparency to visible light, another advantage of the composite of the invention is the chemical inertness of the silicon nitride and fluorocarbon polymer. Those skilled in the art will appreciate that the composite of the invention may also be designed and used for other applications, including optical applications such as selectively transmitting and reflecting various portions of the electromagnetic spectrum. The composite of the invention is different from composites of the prior art both as to the combination of the silicon nitride and the fluorocarbon polymer, and also in that the silicon nitride layers and the fluorocarbon polymer layers are formed by deposition processes and not laminated by adhesively or otherwise bonding preformed ribbons or sheets of material to form a layered structure. However, it is also within the scope of the invention, and forms one embodiment thereof, that one or more composites of the invention may be laminated to each other or to other composites or materials, or combinations thereof, to form a laminated structure comprising at least one and preferably two or more composites of the invention.

The silicon nitride layers formed by the deposition processes useful in the practice of the invention are light transparent and amorphous. The silicon nitride also has very good resistance to moisture permeation and good corrosion resistance to a variety of corrosive environments, in addition to being light transparent. As set forth above, the fluorocarbon polymer useful in the practice of the invention is light transparent and preferably hydrophobic. One particular type of fluorocarbon polymer useful in the practice of the invention comprises a family of light transparent, amorphous polymers having excellent chemical resistance formed by reacting 2,2-bistrifluoromethly-4,5-difluoro-1,3-dioxole (PDD) with itself to form a homopolymer or by reacting PDD with other fluorine containing monomers, such as tetrafluoroethylene (TFE), vinylidine fluoride, chlorotrifluoroethylene, vinyl fluoride, and perfluoro(alkyl vinyl ethers). Commercially available copolymers of PDD with TFE, where PDD is the principle monomer, are available as Teflon AF from DuPont. Illustrative, but nonlimiting examples of other fluorocarbon polymers useful in the practice of the invention include polytetrafluoroethylene or PTFE as it is known, copolymers of TFE with hexafluoropropylene commercially available as Teflon FEP from DuPont, and copolymers of TFE with perfluoro(alkyl vinyl ethers) commercially available from DuPont as Teflon PFA. While some or all of these fluorocarbon polymers may be light opaque in bulk form, thet are light transparent at the layer thickness used in the invention.

The layer deposition processes useful in the practice of the invention include the various PVD processes such as sputtering and evaporation. Also useful is plasma polymerization, monomer vapor deposition, various chemical vapor deposition, low pressure chemical vapor deposition and plasma enhanced chemical vapor deposition processes, which are known to those skilled in the art. High speed methods for applying a coating or layer to a substrate on a roll or reel are also known and are disclosed, for example, in U.S. Pat. Nos. 4,543,275 and 5,032,461. Generally, only one layer at a time is deposited in a vacuum chamber. Thus, a layer of silicon nitride is deposited on one or both sides of the substrate. Then the target material in the vacuum chamber is changed to the fluorocarbon polymer or the silicon nitride coated substrate is transferred to another chamber in which the target material is the fluorocarbon polymer. The fluorocarbon polymer is then deposited as a layer over the silicon nitride layer(s). If desired however, at least one layer of silicon nitride and at least one layer of fluorocarbon polymer are deposited on one or both sides of the substrate within one vacuum chamber by employing in the chamber, at least two deposition sputter targets. For example, in a vacuum chamber in which the layer deposition occurs by magnetron enhanced sputtering, the substrate is one electrode and the target material to be deposited on the substrate is the other electrode, with the plasma inbetween the electrodes in the case of depositing a layer on one side of the substrate. Alternately, the target material and plasma are over both sides of the substrate for depositing a layer on both sides at the same time, in which case a layer of either silicon nitride or fluorocarbon polymer is deposited over both sides of the substrate or silicon nitride coated substrate. Further if the substrate is a moving strip or film, then more than one material is deposited in one pass of the substrate by sequentially employing more than one target in the vacuum chamber. Thus, if the substrate is a moving strip or film, as the substrate moves past the first target or set of target which, for the sake of illustration is the silicon nitride, a layer of silicon nitride is deposited on one or both sides of the substrate. As the silicon nitride coated substrate continues to move to a second target or set of targets in the chamber downstream of the first target(s), a layer of fluorocarbon polymer is deposited over the silicon nitride layer, and so on. Thus, a multiple number of layers may be applied to the substrate in one pass of the substrate in the vacuum chamber to form a composite such as that illustrated in FIG. 1, or a composite having more less layers than that illustrated in FIG. 1. This process permits production of a relatively large volume of the composite of the invention at a reasonably manufacturing cost.

Figure 2A:
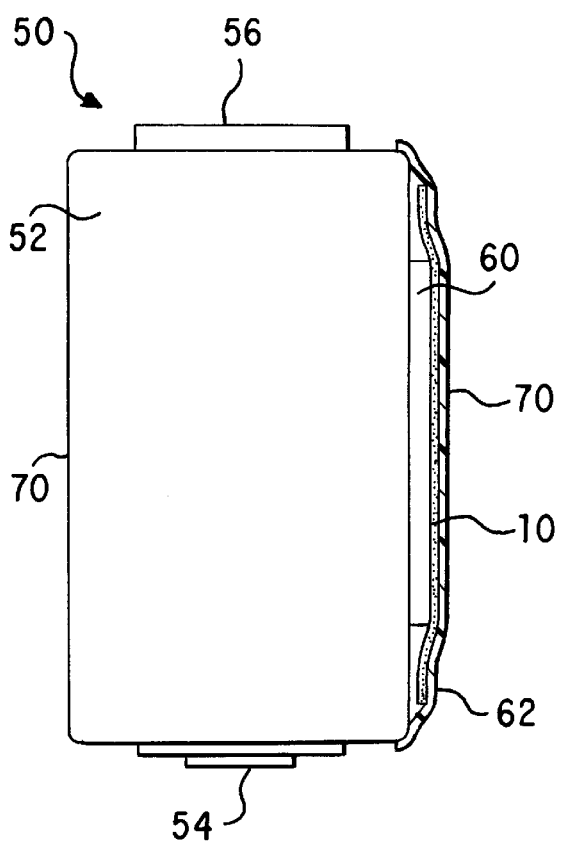
FIG. 2(a) schematically illustrates a cross-section of an on-cell tester on a cell with a moisture barrier of the invention and FIG. 2(b) schematically illustrates, in partial phantom, a side view of a cell having an on-cell tester and a moisture barrier of the invention.
Figure 2B:
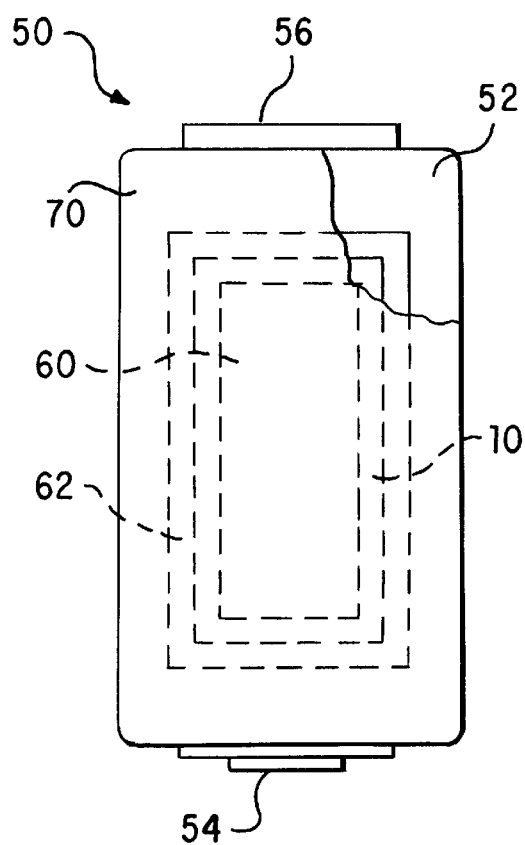

As set forth above, U.S. Pat. Nos. 5,250,905 and 5,339,024 disclose on-cell testers which may contain one or moisture sensitive components and which therefore require that a moisture barrier be employed in conjunction with the tester to prevent moisture from impairing the effectiveness of the tester as disclosed in U.S. Pat. No. 5,355,089. One method which has met with some success is the use of a small sheet of mica disposed over the on-cell tester and sealed by means of a suitable moisture resistant material, such as polyisobutylene, as disclosed in the '089 patent. FIGS. 2(a) and 2(b) schematically illustrate a side view of an on-cell tester on a cell with a moisture barrier of the invention and a top view in partial phantom, respectively. Thus, FIG. 2 schematically illustrates an electrochemical cell 50 having an on-cell tester 60 of the type disclosed in the '089 patent and which contains at least one hygroscopic component (not shown), with a thin film, multilayer moisture barrier of the invention 70 disposed over the tester and sealed to the outside of the metal cell container 52 by means of sealant 62 and with plastic label 70 wrapped around the cell and disposed over the tester, seal and moisture barrier. Tester 60 is about 10 mils thick and is attached to the positive 54 and negative 56 terminals of the cell by means not shown. As disclosed in the '089 patent, tester 60 contains, for example, a polymer electrolyte containing 0.5M lithium trifluorosulfonate in an aprotic solvent (i.e., ethylene carbonate and propylene carbonate) and polyvinylidine fluoride, which is very hygroscopic. The sealant material is, for example, a maleic anhydride modified polybutylene elastomer available a Vestoplast V3645 from Huls, Inc. in Piscataway, N.J. The label is a PVC film wrapped around the cell and moisture barrrier/tester/sealant and then heat shrunk. As a practical matter, for use as a moisture barrier for an on-cell tester on an electrochemical cell, such as the on-cell label testers disclosed in the patents referred to above, the total thickness of the moisture barrier is no greater than about one and one-half mils and preferably within about one mil or 25 microns.

The moisture barrier of the invention 10 comprises a one mil thick polyethylene naphthenate film as the substrate over both sides of which has been deposited a layer of silicon nitride, with a layer of Teflon AF deposited over each layer of silicon nitride, as is illustrated in FIG. 1, to yield a moisture barrier essentially 1 mil thick and having a moisture vapor transmission rate of less than 8 micrograms of water per square inch of surface area over a twenty four hour period measured according to the procedure set forth below. Each silicon nitride layer is 500 angstroms thick and each layer of Teflon AF is 1,500 angstroms thick. The silicon nitride layers and the Teflon AF layers are deposited by radio frequency (RF) magnetron sputtering at 31° C. in argon, at a pressure of 1.5 millitorr.

The water permeation or the moisture vapor transmission rate of the moisture barrier composite is measured by placing a strip of polymer electrolyte 0.25 inches wide, 1 inch long and 3 mils thick, and which contains 70 wt. % of 0.5M lithium trifluorosulfonimide salt in 3-methylsulfolane and 30 wt. % polyvinylidine fluoride, onto a sheet of mica 1.5 mil thick. A 1 inch wide and 1.7 inch long rectangle of the moisture barrier of the invention is placed over the strip and then sealed to the mica by a maleic anhydride modified polybutylene elastomer sealant 2.5 mils thick to form a laminate, as generally illustrated in FIG. 2. Thus, the hygroscopic strip is sealed between the mica and moisture barrier by means of the sealent. This is done under anhydrous conditions in a sealed glove box. The so-formed laminate is then kept at 60° C. and 100% relative humidity for one week, after which the strip of polyvinylidine fluoride containing the solvent and salt is removed and analyzed for its water content by Karl Fischer titrometry. This is the test method and test conditions referred to and used in the examples below.

The invention will be further understood by reference to the examples below, in all of which the moisture barrier is light transparent.

EXAMPLES

Example 1

In this example a 1 mil thick film of polyethylene naphthenate (Kalodex) is the substrate and a 500 angstrom thick layer of silicon nitride is RF sputter coated on each side of the substrate in 1.5 millitorr of argon from a silicon nitride target. The silicon nitride layers deposited by this process are amorphous. After this, a 1500 angstrom thick layer of Teflon AF is RF magnetron sputter coated over each of the two silicon nitride layers in 1.5 millitorr of argon from a Teflon AF target. The so-formed light transparent, thin film, multilayer moisture barrier has a water vapor transmission rate of less than 8 micrograms of water per in$^2$ of surface per 24 hour period, as determined by the test method referred to under the DETAILED DESCRIPTION above.

Example 2

In this example a 1 mil thick film of polyethylene naphthenate (Kalodex) is the substrate and is sputter coated in 1.5 millitorr of argon with silicon nitride to form a layer or coating of amorphous silicon nitride about 500 angstroms thick only on one side of the substrate. PTFE is then sputtered onto the silicon nitride layer to form a PTFE layer 1500 angstroms thick. This process is repeated once to form a light transparent, thin film, multilayer moisture barrier comprising four alternating layers of amorphous silicon nitride and PTFE (2 silicon nitride and 2 PTFE) on one side of the substrate and the moisture barrier has a water vapor transmission rate of 28 micrograms of water per square inch of surface area over 24 hours using the test method of Example 1.

Comparative Example A

This experiment is similar to that of Example 1 with respect to the RF sputtering in argon, the polyethylene naphthenate substrate and moisture transmission test method. In this experiment, one side only of the substrate is sputter coated with a layer of silicon oxide 500 angstroms thick from an SiO$_2$ target and this layer of silicon oxide was then sputter coated with a layer of PTFE 500 angstroms thick from a polytetrafluoroethylene (PTFE) target. This process was repeated twice, alternately depositing a silicon oxide layer and a Teflon AF layer to produce a light transparent composite comprising six alternating layers of SiO$_x$ and PTFE (three SiO$_x$ and three PTFE), exclusive of the substrate, with the sixth or outer layer being PTFE. The so-formed light transparent moisture barrier has a water vapor transmission rate of 250 micrograms of water per in$^2$ of surface per 24 hours using the test method of Example 1.

Comparative Example B

This experiment is also similar to that of Example 1 with respect to the RF sputtering deposition in argon, the polyethylene naphthenate substrate and moisture transmission test method. In this experiment both sides of the substrate film are coated with a layer of TiO$_2$ 150 angstroms thick over which is deposited a layer of Teflon AF 500 angstroms thick to produce a composite such as that illustrated in FIG. 1. The so-formed light transparent moisture barrier has a water vapor transmission rate of about 530 of micrograms of water per in$^2$ surface per 24 hours using the test method of Example 1.

Comparative Example C

This experiment is also similar to that of Example 1 with respect to the RF sputtering deposition in argon, the polyethylene naphthenate substrate and moisture transmission test method. In this experiment both sides of the substrate film are coated with a layer of ZrO$_2$ 200 angstroms thick over which is deposited a layer of Teflon AF 500 angstroms thick to produce a four layer composite on the substrate such as that illustrated in FIG. 1. The so-formed light transparent moisture barrier has a water vapor transmission rate of about 300 micrograms of water per in$^2$ of surface per 24 hours using the test method of Example 1.

Comparative Example D

This experiment is also similar to that of Example 1 with respect to the RF sputtering deposition in argon, the polyethylene naphthenate substrate and moisture transmission test method. In this experiment both sides of the substrate film are coated with a layer of Al$_2$O$_3$ 500 angstroms thick over which is deposited a layer of (PTFE) 500 angstroms thick to produce a composite such as that illustrated in FIG. 1. The so-formed light transparent moisture barrier has a water vapor transmission rate of about 300 micrograms of water per in$^2$ of surface per 24 hours using the test method of Example 1.

Comparative Example E

This experiment is similar to that of Example 1 with respect to the RF sputtering deposition in argon, the polyethylene naphthenate substrate and moisture transmission test method. In this experiment one side only of the substrate film is coated with a layer of SiO$_x$ 500 angstroms thick over which is deposited a 500 angstrom thick layer of Teflon AF. This process is repeated twice to produce a composite (exclusive of the substrate) having six alternating layers of (three layers of SiO$_x$ and three layers of Teflon AF) with the sixth or outer layer being Teflon AF. The so-formed light transparent moisture barrier has a water vapor transmission rate of about 300 micrograms of water per in$^2$ of surface per 24 hours using the test method of Example 1.

Comparative Example F

This experiment is similar to that of Comparative Example D except that Teflon AF is used instead of PTFE. The so-formed light transparent moisture barrier has a water vapor transmission rate of about 300 micrograms of water per in$^2$ of surface per 24 hours using the test method of Example 1.

It is understood that various other embodiments and modifications in the practice of the invention will be apparent to, and can readily made by, those skilled in the art without departing from the scope and spirit of the invention disclosed above. Accordingly, it is not intended that the scope of the claims appended hereto be limited to the description set forth above, but rather that the claims be construed as encompassing all of the features of patentable novelty which reside in the present invention, including all features and embodiments which would be treated as equivalents thereof by those skilled in the art to which the invention pertains.

What is claimed is:

1. A label/tester composite for an electrochemical cell, said composite comprising a label and an electrochemical tester in contact with said label, said tester having a light transparent moisture barrier for protecting said tester from moisture, wherein said moisture barrier comprises a composite on a polymeric substrate, said moisture barrier composite comprising at least one layer of amorphous silicon nitride and at least one layer of a hydrophobic fluorocarbon polymer, alternately deposited over each other, wherein the thickness of said silicon nitride and fluorocarbon polymer layers ranges between about 250 to 2500 angstrom and between about 250 angstrom to about 1 micron, respectively, and wherein said moisture barrier is no greater than one and one half mils thick.

2. The label/tester composite of claim 1 wherein said moisture barrier composite comprises at least two layers of said silicon nitride and at least two layers of said fluorocarbon polymer.

3. The label/tester composite of claim 2 in which the layers of said moisture barrier closest to said label are polymeric.

4. The label/tester composite of claim 1 in which the thickness of each of the fluorocarbon polymer layers is between about 300 and 5,000 angstroms.

5. The label/tester composite of claim 1 in which said moisture barrier has water vapor permeability of less than 8 micrograms of water per square inch of surface area over a twenty four hour period.

6. The label/tester composite of claim 5 wherein said fluorocarbon polymer comprises at least one polymer selected from the group consisting of (i) polytetrafluoroethylene (PTFE), (ii) copolymers of tetrafluoroethylene (TFE) with hexafluoropropylene, (iii) copolymers of TFE with perfluoro(alkyl vinyl ethers), and (iv) polymers formed by reacting 2,2-bistrifluoromethyl-4,5 difluoro 1,3dioxole (PDD) with at least one monomer selected from the group consisting of PDD, TFE, vinylidene fluoride, chlorotrifluoroethylene, vinyl fluoride, perfluoro(alkyl vinyl ethers) and mixtures thereof.

7. The label/tester composite of claim 6 wherein said fluorocarbon polymer is formed by reacting said PDD with at least one monomer selected from the group consisting of PDD, TFE, vinylidene fluoride, chlcrotrifluoroethylene, vinyl fluoride, perfluoro (alkyl vinyl ethers) and mixtures thereof.

8. The label/tester composite of claim 7 wherein said fluorocarbon polymer is a reaction product of said PDD and said TFE.

9. The label/tester composite of claim 5 wherein said moisture barrier composite comprises alternating layers of said silicon nitride and said fluorocarbon polymer.

10. The label/tester composite of claim 9 wherein said fluorocarbon polymer comprises at least one polymer selected from the group consisting of (i) PTFE, (ii) copolymers of TFE with hexafluoropropylene, (iii) copolymers of TFE with perfluoro(alkyl vinyl ethers), and (iv) polymers formed by reacting 2,2-bistrifluoromethyl-4,5-difluoro- 1,3-dioxole (PDD) with at least one monomer selected from the group consisting of PDD, TFE, vinylidene fluoride, chlorotrifluoroethylene, vinyl fluoride, perfluoro(alkyl vinyl ethers) and mixtures thereof.

* * * * *